United States Patent [19]
Faris et al.

[11] Patent Number: 5,565,729
[45] Date of Patent: Oct. 15, 1996

[54] MICROCHANNEL PLATE TECHNOLOGY

[75] Inventors: Sadeg M. Faris, Pleasantville; Kanti Jain, Briarcliff Manor, both of N.Y.

[73] Assignee: Reveo, Inc., Hawthorne, N.Y.

[21] Appl. No.: 158,421

[22] Filed: Nov. 29, 1993

Related U.S. Application Data

[63] Continuation of Ser. No. 759,391, Sep. 13, 1991, Pat. No. 5,265,327.

[51] Int. Cl.$^6$ ........................................... H01J 43/04
[52] U.S. Cl. ........................ 313/103 CM; 313/105 CM
[58] Field of Search ..................... 313/103 CM, 103 R, 313/105 CM, 528, 532, 534, 535, 536

[56] References Cited

U.S. PATENT DOCUMENTS

| | | | |
|---|---|---|---|
| 3,564,323 | 2/1971 | Maeda | 313/103 CM |
| 3,612,946 | 10/1971 | Toyoda | 313/103 CM |
| 3,979,621 | 9/1976 | Yates | 313/103 CM |
| 4,071,474 | 1/1978 | Kishimoto | 313/103 CM |
| 4,385,092 | 5/1983 | Singer, Jr. | 313/103 CM |
| 4,764,139 | 8/1988 | Murata et al. | 313/105 CM |
| 4,912,314 | 3/1990 | Sink | 313/103 CM |

*Primary Examiner*—Sandra L. O'Shea
*Assistant Examiner*—Ashok Patel
*Attorney, Agent, or Firm*—Thomas J. Perkowski, Esq.

[57] ABSTRACT

A process for fabricating microchannel plates produces large area microchannel plates that have channel exit openings as small as 0.5 micron, MTF~1, pitch-limited resolution (a factor of 10 potential improvement in resolution) and at a cost of $0.40/sq. centimeter, and with funneling controlled as to configuration and exit opening size and shape. Microchannels may be rectangular in cross section, or rectangular, or trapezoidal, or other configuration, including straight sided, chevron or balloon sided. Microchannels of differing configurations may be interspersed, for reasons of alignment or to control pixel characteristics. Material choice may include glass, ceramic, metal, alloy and plastics, plus dopants. This materials flexibility, and the improved geometrical uniformity lead to higher signal-to-noise ratio and lower outgassing, and to a significant improvement in performance. Microchannels are formed in 'green' glass/ceramic ribbons using high-precision, low-cost and versatile planar process steps, eliminating the need for the fiber-drawing and chemical-etching. The ribbon of green glass/ceramic powder in a binder and solvent slurry is configured in complementary partial microchannel forming grooves and partially dried to a safe handling condition, then carefully stacked upon a takeup device with precise alignment. The stack is cut into segments for final solidification by heat fusing and curing and sliced, then smoothed and equipped with appropriate ion barrier and electrode layers for use as microchannel plates.

11 Claims, 4 Drawing Sheets

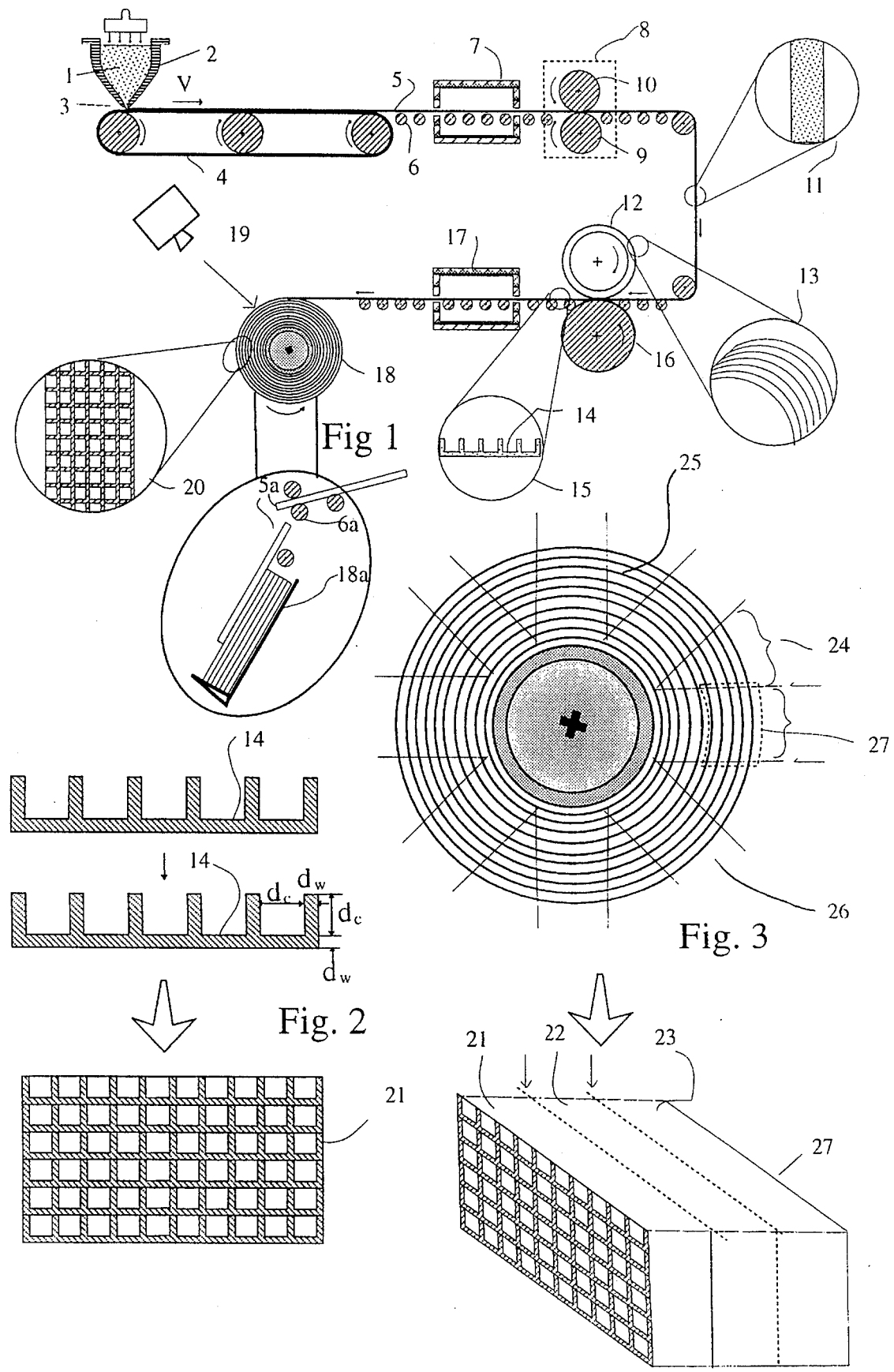

MICROCHANNEL PLATE TECHNOLOGY

RELATED CASE

This is a continuation of U.S. patent application Ser. No. 07/759,391, filed on Sep. 13, 1991, now issued as U.S. Pat. No. 5,265,327.

BACKGROUND OF THE INVENTION

1. Field of the Invention

This invention relates to microchannel plate technology, and more particularly relates to an improved microchannel plate and the method for manufacturing it.

2. Description of Related Art

MICROCHANNEL PLATES

The prior art microchannel plate (MCP) is used as a secondary electron multiplier consisting of millions of glass microchannels in the form of capillary tubes which are assembled and fused together to form a two-dimensional array in the shape of a disk. The capillary tubes are formed by drawing down glass-filled, glass-jacketed rods, and then etching out the glass filling. Typical microchannel diameters range from ~40 μm to ~10 μm, with the corresponding channel pitch being such that the channel cross-sectional areas constitute ~50% of the total MCP face area. Metal films, deposited on both faces of the disk, serve as electrodes for applying an electric field across each channel and also electrically connect the multitude of channels together in parallel. Each channel behaves as a sort of continuous-dynode electron multiplier. The input end of an MCP-based detector includes a suitable photocathode optimized for the spectral characteristics of the incident radiation. The photocathode receives the incident photons and generates the primary photoelectrons which then enter the glass capillary channels. The capillary material is specially chosen (the most common being a lead-oxide glass) such that when electrons impinge on the channel walls, secondary electrons are generated. These secondary electrons are accelerated by the voltage applied across the electrodes and travel in a parabolic trajectory along the length of the channels, until, due to the transverse component of their motion, they collide with the channel walls and dislodge additional secondary electrons with each impact, thus producing electron multiplication, or gain.

In addition to the channels for secondary-electron multiplication, the photocathode for generating the primary electrons, and the front and rear electrodes for applying the accelerating electric field, a microchannel plate device generally also has an ion-barrier film at its input end. Ions may be generated within the channels by several mechanisms, including ionization of the residual gas atoms and molecules (since the vacuum in the channels is no better than $\sim 10^{-6}$–$10^{-5}$ Torr) and direct sputtering from the channel walls by high-energy electrons as well as other ions. The generated ions, which are accelerated toward the input face of the MCP, are prevented by the ion-barrier film from impinging upon the photocathode, which would otherwise be contaminated. The ion-barrier film, e.g., a few hundred Ångstrom thick $SiO_2$ film, is applied as a membrane on top of the input electrode metal film.

Detection of low-level signals—optical (infrared, visible, ultraviolet and X-ray) as well as particle (electrons and ions)—is a critical requirement in a wide variety of applications, both military and civilian. A good example of devices whose performance depends on their ability to amplify very low-level input signals with large gain ($\geq 10^4$) are night vision systems, which constitute an important part of the increasingly complex and technologically-intensive equipment employed in modem warfare. Currently available high-gain detectors include numerous types of photomultiplier tubes (PMTs) and image-intensifier tubes (IITs), many of which incorporate microchannel plates as the primary amplifying device. MCP-PMTs and MCP-IITs are also extensively used in other military and space applications, such as laser satellite ranging systems, grazing-incidence telescopes for soft X-ray astronomy, and concave grating spectrometers for exploration of planetary atmospheres. Diverse scientific and technological endeavors in which MCP-based detectors are used include quantum position detectors, X-ray image amplifiers, field-ion microscopes, electron microscopes, fast oscilloscopes, observation and spectroscopy of low-level fluorescence and luminescence in living cells, radioluminescence imaging, and time-correlated photon counting. Indeed, the technology for manufacturing instruments for capturing and displaying images at low light levels has progressed to such a level that several new areas of investigation, some mentioned above, which were previously thought inaccessible, have now opened up.

Quantitative detection and imaging of objects at low light levels places demanding requirements on the performance parameters of the detectors relating to spatial resolution, signal-to-noise ratio, response speed, output linearity, dynamic range, and reliability. Although currently available detectors perform satisfactorily in several applications, significant further improvements in resolution are desirable and necessary to extend the applicability of MCP-based devices to meet more critical requirements. Even though MCP channel diameters as small as 5 μm are available, the resolution degrades significantly because of the extremely low Modulation Transfer Function (MTF). This results from the spreading of the secondary electron beam to a width several times the channel diameter. There is, therefore, a need for means to focus the individual beams to increase the MTF. This focusing need cannot be met by present MCP manufacturing technology. Simultaneously, the complexity of present manufacturing technologies and the extremely limited number of manufacturers have made the cost of such detectors too prohibitive to allow their use in a wider scope of applications that require low-cost equipment, such as inexpensive night-vision goggles, fast (>1 GHz) oscilloscopes, and optical computing.

Microchannel plates are almost always geometrically so designed that the channel axes are at a small angle ('bias angle') to the perpendicular to the input and output faces. In addition, often two MCPs are used in tandem in a chevron geometry. The bias angle and the chevron geometry not only insure that the primary photoelectron emitted by the photocathode will strike the channel wall near the channel's entrance, but also reduce the light feedback from the phosphor screen at the output end of the MCP to the photocathode. Additionally, the bias angle also contributes in reduction of the ion feedback.

Conventional MCP Manufacturing Technology

The current process used in the industry for manufacturing microchannel plates is primarily based on the technology of drawing glass fibers and fiber bundles. The fabrication process begins with tubes of a specially formulated glass, usually a lead-oxide composition, that is optimized for secondary-electron emission characteristics. In the tubes are inserted solid cores of a different glass with differential chemical etching characteristics. The filled tube is softened and drawn to form a monofiber. Millions of such fibers are now stacked together in a bundle in a hexagonal-close-packed format. The bundle is fused together at a temperature of ~500°–800° C. and again drawn until the solid core diameters become approximately equal to the required channel diameter, which ranges from ~40 μm down to <10 μm. Now individual microchannel plates are cut from this billet by slicing at the appropriate bias angle to the billet axis. The thickness of the slices is generally such that the channels have a length-to-diameter ratio of ~40–80.

The individual plates are ground and polished to an optical finish. The solid cores are removed by chemical etching in an etchant that does not attack the lead-oxide glass walls, thus producing the hollow channels. Further processing steps lead to the formation of a thin, slightly conductive layer beneath the electron-emissive surface of the channel walls. Electrodes, in the form of thin metal films, are then deposited on both faces of the finished wafer. Finally, a thin membrane of $SiO_2$ (formed on a substrate which is subsequently removed) is deposited on the input face to serve as an ion barrier film, and the plate is secured in one of several different types of flanges. The finished MCP may now be incorporated in various image-intensifying detection systems.

DETAILED DESCRIPTION OF THE PRIOR ART

For best understanding of the microchannel plate, it is best to review in detail the manufacturing process for conventional MCPs. FIGS. 4–6 illustrate both the prior art MCP and the Reveo RMCP of this invention. FIGS. 7 and 8 show the conventional MCP production process of drawing and etching.

FIG. 4 shows MCP/RMCP. Microchannels 101 are held in flange 102. Electrodes and connections, plus ion-barrier film and other items necessary for operation, are not shown. The function of the MCP or RMCP is to augment the strength of the optical signal input without distortion.

FIG. 5 shows how electron amplification takes place. Electron 103 arrives from the left-to-right direction, and enters the microchannel tube 104. Voltage $V_D$ from voltage source 105 supplies the high voltage necessary for the electron acceleration. Each electron, whether introduced as electron 103 or generated within the tube 104, may dislodge one or more other electrons, which may proliferate to hundreds, or even hundreds of thousands, of electrons.

FIG. 6 shows how a photon striking electrode 106 dislodges an electron ($e^-$) which passes through chevron configuration microchannel plates 107 and 108 with electron amplification and emerges as a great number of electrons ($Ge^-$) which strike phosphor layer 109 and result in phosphorescent light output P.

FIG. 7 shows how a tiny glass-clad glass rod is drawn down to a capillary size, essentially by heating it to a softened state and then pulling. This leaves inner glass 111 still clad in outer glass 112, with both drawn down to a miniature capillary size. Additional steps are required to remove glass core 111 to leave the hollow glass robe 112, drawn down to the microchannel size.

FIG. 8 shows how the glass-clad glass cores 111–12 are bundled and drawn down in bundles to capillary size.

FIG. 9 shows how the drawn bundles of glass robes are fused to form robes 113 (which are still filled with glass) with fused walls 114. These bundles are placed at a small angle to the cutting saw and are sliced at places such as slice site 115 to provide microchannel blanks.

FIG. 10 shows schematically how microchannel slice 115 has channels 116 at a slight angle to the perpendicular to the slice face. The microchannels 116 may be etched out with a suitable etchant which attacks the core glass much more quickly than it might attack the cladding glass, leaving the tubes hollow.

FIG. 11 shows how the myriad microchannels 116 are fused together and held in flange 117.

FIG. 12 shows how ion-barrier film 118 and electrodes 119 are placed over the ends of the microchannels which are held together in flange 117. Electrodes 119 are connected to a suitable voltage source. These electrodes are indium tin oxide or other transparent conductor. Ion-barrier film 118 may be $SiO_2$.

PROBLEMS OF THE PRIOR ART

A. Material:

There is very low flexibility in choosing MCP materials. Choice of materials is constrained by the requirements of low softening temperatures and differential etching of the etchable-glass-cored drawable-glass tubes. This leads to only a few materials-glasses that are doped appropriately to meet those constraints-thereby having the following adverse effects on performance:

1. Defects, impurities, nonuniformities, and residues from etching reduce the S/N ratio and increase energy dispersion.
2. Lower softening temperature limitation contributes to out-gassing.
3. Narrow material spectrum precludes optimized secondary emission (by means of optimum surface treatment), leading to lower gain, and lower saturation voltage.
4. Ceramics and glass/ceramics are difficult to etch within the constraints of channel configuration and size.

The net amplification gain of an MCP depends on several parameters, including: the initial energy of the primary photoelectrons, the channel-wall surface material (through its secondary-electron emission coefficient), the multiplier (accelerator) voltage ($V_m$), the channel length-to-diameter ratio ($L/d_c$), the 'open-area ratio' (OAR, defined as the total cross-sectional area of the channels as a fraction of the plate face area), and the penetration of the output electrode film into the channels, known as the 'end-spoiling' factor. In determining the optimum design of an MCP for a particular application, some of the above factors interplay with each other and often tradeoffs must be made. For example, for a given $L/d_c$ ratio, as the multiplier voltage is raised, the gain of the MCP tube increases; but so does the signal-to-noise ratio. The dependence of gain on the $L/d_c$ ratio is different for different multiplier voltages: at high $V_m$ values the gain increases with increasing $L/d_c$, whereas for low values of $V_m$ the trend is the opposite. The end-spoiling factor, on the one hand, is useful in increasing the collimation of the secondary electrons exiting the channels, but on the other hand, it causes decrease in the gain. Thus, the design and selection of various geometrical and electrical parameters of MCPs must be carefully considered for their intended application. Two or more MCPs may be required to achieve the highest gain and signal strength.

B. Resolution:

The resolution of an MCP is dependent on the pitch and the diameter of the channels as well as the energy dispersion, the accelerating voltage, and the distance between the MCP and the phosphor surface. Typically, the secondary-electron beam width at the phosphor screen is three times the channel diameter, leading to a very low MTF and making the need for focusing quite necessary. By the fusing, drawing and etching method, it is impossible or prohibitively expensive to make channel diameters<4 microns and maintain OAR>50%. Previous generation MCPs achieve MTFs well below unity and no dramatic increase is anticipated (the ideal MTF is 1 at the channel array pitch). The following are problems related to reduced diameters:

1. The walls between the channels become too weak to withstand the subsequent processing steps, especially when the optimum MCP thickness is proportionally reduced constrained by $L/d_c \sim 40$. This leads to poor yield, and reduced useful areas.
2. Etching of narrower channels becomes more difficult.
3. The etching non-uniformity, and spatial pattern non-uniformity lead to further increase in noise.
4. The production of large areas becomes more difficult.

C MCP Area:

For the smallest-pitch MCP, the prior art manufacturing technology limits the useful area that can be achieved to about 5 sq. centimeters, consequently precluding applications requiring the highest-resolution MCP with large areas, e.g., a rectangular area of 20×25 sq. centimeters.

Cost:

The prior-art manufacturing technology is inherently high-cost due to the numerous processing steps required; a 25 mm diameter, 5 micron pitch MCP costs in the range of $500–$1000.

To summarize the prior art, the microchannel plate is "drawn and etched." The fabrication technology is based on the fiber drawing approach, in which drawable hollow glass capillary tubes with solid cores of preferentially etchable glass are bundled and sufficiently drawn to reduce the tubes to the required small size and cores to the required channel diameter, and subsequently fused as a bundle. After fusing, the cores are removed chemically etched out after the fiber bundle has been fused. This leads to these problems:

limited choice of materials, low resolution, small size of microchannel plate, and high cost.

SUMMARY OF THE INVENTION

Objects

The object of the invention is to provide a microchannel plate and a fabrication technology which is not based on the fiber drawing approach, does not require rods or tubes of special glass, does not rely upon multiple drawing steps, is not limited to glass as a material, does not require chemical etching, has enhanced control of microchannel dimensions and other parameters, and can produce large area MCPs.

Another object of the invention is to add control to "funneling," the control of microchannel internal configuration that produces tapering microchannels with entry openings on 5 micron pitch and channel exit openings as small as 0.5 µm, thereby providing a focusing mechanism that leads to a modulation transfer function of near unity and hence a resolution equal to the channel pitch.

Another object of the invention is to provide pitch-limited resolution (a factor of 10 potential improvement in resolution over prior art) and at a low factor of 10 reduction in cost to $0.40 per square centimeter.

Another object is to develop an MCP technology that not only provides an imaging system with superior technical performance—e.g., ultrafine resolution and greater signal-to-noise ratio—but also delivers a highly versatile, low-cost, and reliable MCP fabrication process, thus enabling wide use of these devices in military, space and civilian applications.

Another object is to allow flexibility in choice of the materials and improved geometrical uniformity, which lead to higher signal to noise ratio and lower outgassing.

Another object is to provide a wide variety of patterns, material compositions, sizes and shapes at low cost, thereby providing for many new uses of microchannel plates.

Features

A feature of the invention is the forming of microchannels in 'green' sheets of solidifiable powder using high-precision, low-cost and versatile planar process steps, eliminating the need for the fiber-drawing and chemical-etching based methods.

Another feature of the invention is its use of 'planar' process steps, inexpensive green glass-green ceramic sheet technology, and highly automatable, mature, and cost-efficient relief replicating techniques.

Another feature of the invention is the convenient application of electron donors and other specialty materials along the inner walls of the microchannels.

Advantages

An advantage of the invention is that it achieves significant advances in MCP performance while simultaneously lowering the manufacturing cost.

Another advantage of the invention is that it can achieve very high thermal conductivity, while maintaining any required transparency, as a result of glass/ceramic composition.

Another advantage of the invention is that it can use a variety of materials, such as metals, ceramics, plastics, carbon or other nonmetals, in addition to or as substitutes for glass.

Another advantage of the invention is that it is capable of achieving complex and highly controlled channel configurations, including various new and better versions of the "funnel" configuration.

Another advantage of the invention is that it is capable of taking on the "chevron" channel configuration in a single solid-state device.

Another advantage of the invention is its capability of achieving high resolution at very close pitch distances with very small exit openings while retaining a modulation transfer function (MTF) very close to unity.

Another advantage is that the flat plate process is inherently capable of making large, straight-sided microchannel plates which in turn may be closely spaced together for very large MCP arrays useful as "zero-thickness" substrates.

Other advantages are in solving the problems of prior art, such as the following solutions:

A. Material:

With the new RMCP technology, a very high degree of flexibility is available in choosing materials. For instance, a large variety of glasses, ceramics, metals and alloys, plastics, carbon and other materials in powder form are available to choose from to obtain the most suitable green sheet composition for a particular application. The material composition can be optimized with respect to temperature, mechanical strength, secondary-electron emission, electrical resistivity, and other properties, which leads to performance enhancements as follows:

1. Elimination of channel defects, impurities, and non-uniformities, and increase in the S/N ratio.
2. Reduced out-gassing results from choosing high-temperature glass-ceramic MCP materials.

3. Wider material spectrum leads to more optimized secondary-electron emission (by means of optimum surface treatment), producing higher gain and higher saturation voltage.

B. Resolution:

The RMCP technology is inherently capable of smaller pitch and smaller channel openings, especially with a high level of funneling, making it possible to produce exit channel openings down to 0.5 micron, MTF ~1 and pitch-limited resolution—a factor of 10 improvement.

C. MCP Area:

Large area (e.g., 20 cm×30 cm) MCPs can be produced with the RMCP technology, bringing applications which were not previously possible within the realm of possibility.

D. Cost:

High-resolution Reveo microchannel plates can be produced at a cost of $0.40 per sq. centimeter, which is 20 to 40 times lower than the cost using old MCP technology for applications such as night vision systems.

Other objects, features and advantages of the invention will become apparent from the description of the preferred embodiments as illustrated in the accompanying drawings.

DESCRIPTION OF THE FIGURES

FIG. 1 is a schematic diagram of the process for making the RMCP according to the invention.

FIG. 2 is a composite semidiagrammatic sketch showing how the patterned ribbons are aligned for fusing into the microchannel plate of the invention.

FIG. 3 is a composite semidiagrammatic sketch showing how patterned ribbon is wound upon the takeup reel and thereafter cut in aligned stacks and then sliced and treated to form the microchannel plate of the invention.

DESCRIPTION OF A PREFERRED EMBODIMENT

Figure 4:
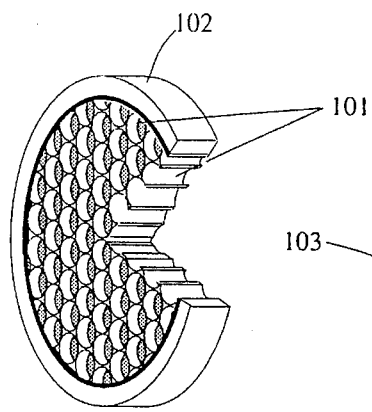
FIG. 4 shows generally a microchannel plate (MCP) or Reveo microchannel plate (RMCP).
Figure 5:
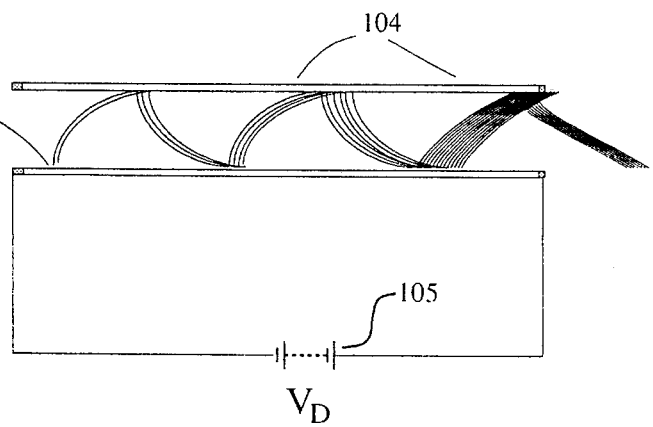
FIG. 5 shows diagrammatically how a single primary electron is augmented by additional secondary electrons which it generates as it travels through the microchannel which acts as an electron multiplier, in this invention or prior art.
Figure 6:
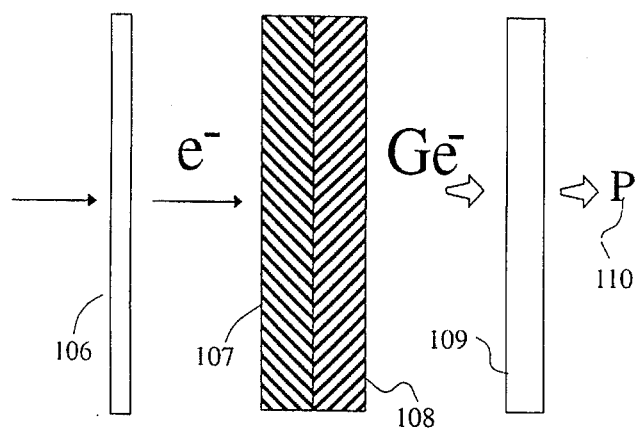
FIG. 6 shows chevron microchannel plate optical amplifier, implemented in RMCP or in MCP technology.
Figure 7:
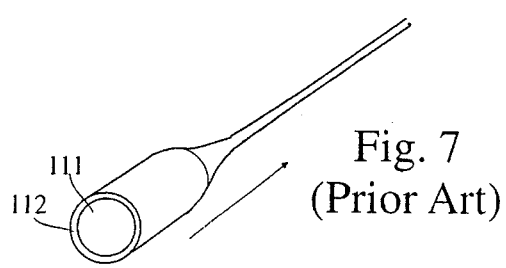
FIG. 7 shows how a glass-coated glass rod is drawn down to a fiber, in prior art.
Figure 8:
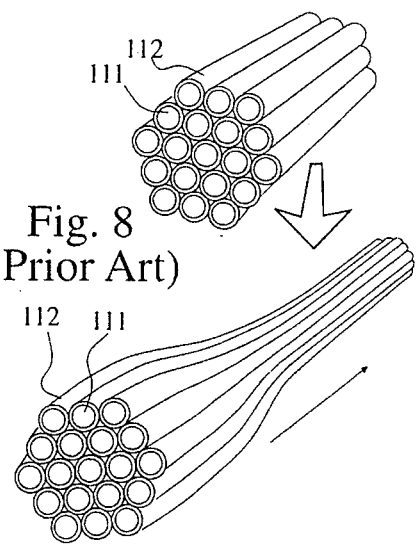
FIG. 8 is a composite drawing showing in semidiagrammatic fashion how in prior art the glass-coated glass fibers are further drawn down to microscopic sizes in a fused bundle.
Figure 9:
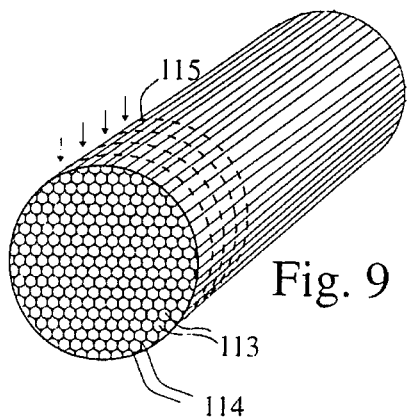
FIG. 9 shows how a solidified bundle of microchannels is sliced into individual microchannel plates, in RMCP or in MCP technology as in prior art.
Figure 10:
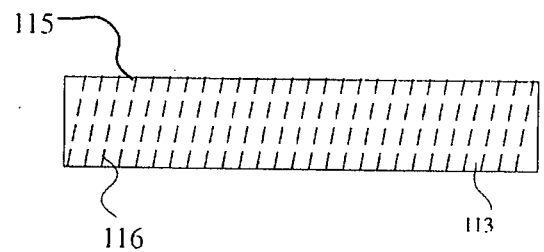
FIG. 10 shows diagrammatically how the individual channels are mechanically biased at an angle to the expected path of incident light, in this invention or prior art.
Figure 12:
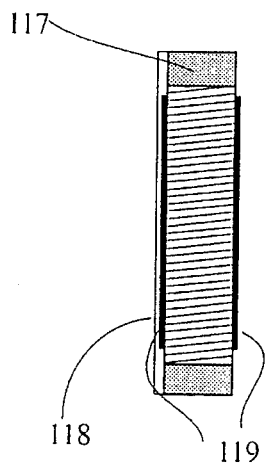
FIG. 12 is a side view of the MCP of FIG. 11, with electrodes attached.
Figure 11:
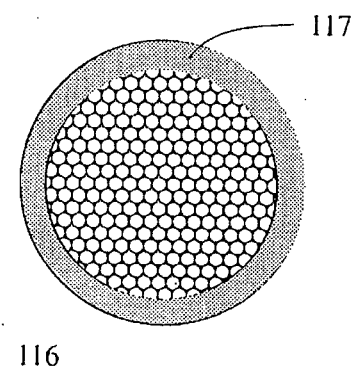
FIG. 11 is a greatly enlarged semidiagrammatic showing of the microchannel plate (MCP) with its mounting flange, in this invention or prior art.

FIGS. 1–3 show the high-throughput relief replication process of the invention in semischematic format. FIG. 1 shows the process equipment. FIG. 2 shows how the laminations are arranged in the MCP. FIG. 3 shows how the laminations are developed from a continuous ribbon.

The plate is fabricated by laminating a large number of green glass-ceramic sheets in which configured microchannels have been formed by the high-throughput relief replication process as shown in FIG. 1. The selected microchannel configuration for this embodiment is square in cross section; The dimensions of the channels at the time of replication are approximately equal to their final dimensions (allowing for shrinkage during firing), and therefore, there is no drawing. Further, the channels are always hollow; hence, no chemical etching is required, resulting in a simpler and higher-yield process, as well as enabling ultimately higher-resolution MCPs. Numerous other advantages of the new technology will become apparent from the description of the process steps below in detail.

The first step in the inventive MCP fabrication technology is the production of green glass-ceramic sheets. The appropriate glass-ceramic composition is chosen based on various MCP performance requirements (e.g., secondary-electron emissivity, resistivity, baking temperature, mechanical strength, etc.) and procured in powdered form with a particle size of <0.1 µm. The powder is mixed with a suitable binder/carrier to form a flowable slurry. (A good example of an attractive binder is polyvinyl alcohol (PVA), which is water soluble, decomposes completely into gaseous products upon heating, and is extensively used in processes involving green glass sheets as well as polymeric materials.) This composition 1 (FIG. 1), somewhat similar to spin-on glass, is provided as a slurry under pressure in dispenser 2, dispensed through a long, linear nozzle 3, onto a conveyor 4 that thus carries away a long sheet or ribbon 5 of the green glass-ceramic. The slurry viscosity, the nozzle 3 size, and the conveyor 4 speed are selected to produce the required sheet 5 thickness, in the range of <5 µm to several tens of mm. Throughout the process, where the glass-ceramic sheet 5 is carried, it is fully supported by synchronously rotating small rollers 6. After the green sheet 5 has been dispensed, it passes through a first drying stage 7 that renders the hardness of the sheet 5 suitable for relief patterning. Prior to patterning, the sheet 5 also goes through a thickness control station 8 in which it is precision-pressed between two counter-rotating cylinders 9, 10 to achieve smooth regular thickness as shown in inset 11.

The green sheet 5 now passes under a replicating (stamping) cylindrical configurating set 12, as shown in inset 13, for patterning channels 14 (stamping one or both sides of the green sheet 5) as shown in inset 15. The roller 12 surface consists of thousands of toothy ridges which are square in cross section (other configuring geometries for funneling are possible; see below) and parallel to the direction of the sheet travel. Roller 12 may be configured to form nearly a complete funnel, in which case roller 16 may simply be flat. This may have the synergistic result of providing the bias angel of microchannels to the surface. Alternatively, however, rollers 12 and 16 are both configured, to form complementary mirror image symmetrical half-funnels. As the green sheet 5 travels through the configuring roller set 12, 16, channels replicating the ridge structure are formed in it. The ridge dimensions are so designed that after allowing for shrinkage that would result in the firing of the green sheets, the replicated grooves produce the desired channel 14 dimensions at the position of roller 16. The ribbon 5 thus configured is now partially dried in a second drying stage 17 at a temperature of ~150° C. to make it suitable for rolling.

The take-up roller 18 for the configured green sheet 5, and the rolling step, are two of the key components in this MCP manufacturing technology. The roller 18 is not only constructed with high mechanical precision, but its rotation is so controlled that vibrational and other errors are kept well below 0.25 µm. In conjunction, a laser interferometric system 19 continuously monitors the stamped channels 14 and ensures that, as the configured green sheet 5 rolls onto the take-up roller 18, successive layers are channel-wise aligned with respect to each other within a fraction of the channel wall thickness, as shown in inset 20. This self-aligning feature is a major contributor in making the proposed process a high-throughput, high-yield, and low-cost technology. The mechanical precision of the take-up roller mechanism 18 and the laser interferometric control 19 with the required accuracy mentioned above are readily available and extensively used in other high-technology areas, e.g., microlithography. Blocks of MCP laminates are now cut as shown in FIGS. 2 and 3 from the configured MCP green glass sheet 5 rolled on the take-up spool 18. Note that the blocks (26 shown) are cut with parallel walls; some rolled material (pie wedges 24, 25 shown) is recycled. This is done so that when, in the next step, smaller sections are cut from one such block and straightened out as shown at bottom of FIG. 3, the number of channels and their dimensions will be the same from the top of the section to the bottom. Finally, individual MCP wafers 21–23 of the desired shapes are sliced from these section stacks. Where desired, a short stack 27 may be used. The stack should be flattened slightly to ensure alignment. The ruing step is carded out in special ovens at elevated temperatures ranging from 600° C. to 1000° C. depending on the glass-ceramic composition. This step is identical to that used in ceramic manufacturing where the green sheets are fired to decompose the PVA binder and the glass-ceramic is sintered or fused to form the final hardened material. The slicing step shown schematically at bottom of FIG. 3 can be carried out before or after the firing step, but before is preferred for ease in cutting.

Cut-Ribbon Platform

Takeup spool 18 may advantageously be replaced by a cut-ribbon takeup platform 18a with appropriate alignment mechanism including alignment sensor 19 and mechanism to cut ribbon lengths and to feed it with precise alignment onto a stack on the takeup platform. This provides flat ribbon lengths, permits easy interspersing of ribbons of differing microchannel-forming configurations, and avoids the waste or the need for recycling of pie wedges 25 as shown in FIG. 3.

For use in a cut-ribbon embodiment, configuring rollers 12, 16 may be segmented so as to configure the microchannels of consecutive sheets differently to intersperse differing microchannel configurations as desired.

Segmenting is also available using the takeup spool 18, although care must be taken to use a large mandrel or to use only outside layers for a short stack 27 (or to specify and maintain dimensions carefully) so that adjacent layers on takeup spool 18 line up longitudinally. For example, a first segment and ribbon layer may be flat and the next slightly angled so as to give the desired bias to the end product microchannel plate. As an alternative, a first segment may provide square microchannel configurations to a first set of microchannels, and a second segment may provide a diamond shaped microchannel configuration to the adjacent second set of microchannels, and so on until the desired degree of differentiation between sets of microchannels is achieved. Segmenting consecutive layers permits the assignment of differently configured microchannels to different colors in the pixel, for example. It also permits the placement of alignment marking microchannels at various places in the stack. These can be useful in manufacturing and also in the final product. A great variety of microchannel configurations are possible, including the classic funnel, plus chevron, balloon, cone and pyramid. Sizes may also be varied. Microchannel cross section variety may be increased from the circular to oval, rectangular, square, trapezoidal or even random. The segments may be divided by ribbon cutting edges so as to eliminate the need for a dedicated ribbon cutting station just prior to the takeup platform.

Photopolymer Embodiment

The microchannel forming indentations of the green ribbon 5 are also configurable by photographic techniques. There are a number of well-known photopolymers and photoresists for which photographic patterning techniques have been well defined. The photopolymer may replace or augment the volatile binder in the slurry for photopolymer patterning. The photoresist may be applied to the green ribbon 5 at any time prior to exposure for photoresist patterning. The green powder slurry 1 for such photographic process is fed as before, along belt 4 and through preprocessing stations such as dimensioning roller station 8, to the patterning station where rollers 12 and 16 are replaced by appropriate photopatterning exposure devices. Drying station 17 is equipped with the necessary copolymerization mechanisms (photopolymer) or photoresist etching mechanisms (photoresist) to achieve the desired indentation configuration in the green ribbon 5 prior to the solidification step.

The configured green ribbon 5 is then processed by takeup spool 18 and its related mechanisms (or by flat stacking mechanism 18a) to prepare stacks for the slicing and curing step. After the stack is completed, solidification of the laminations of the stack is done by techniques appropriate to the materials-heat curing in the case of glass, sintering in the case of ceramic, heat curing or, as appropriate, adhesive lamination in the case of plastics, heat curing in the case of metals and alloys.

Controlled Funneling

Figure 13:
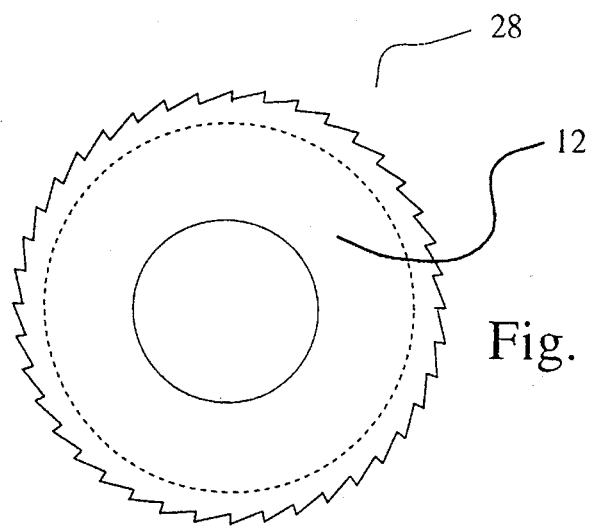
FIG. 13 shows the patterning roller for producing a funneled microchannel of this invention.
Figure 14:
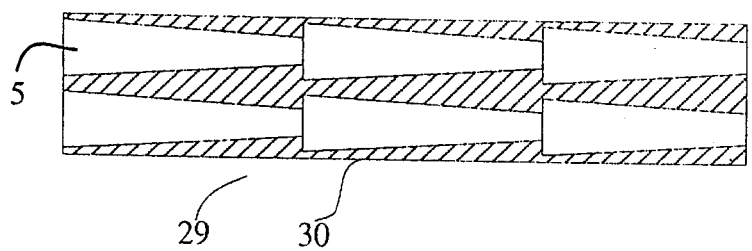
FIG. 14 is an enlarged top view showing of the microchannels patterned by the roller of FIG. 13.
Figure 15:
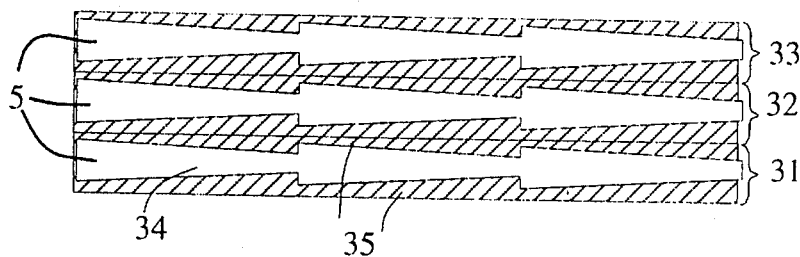
FIG. 15 is an enlarged side view of a stack of glass-ceramic sheets in which microchannels have been patterned by the roller of FIG. 13.

FIGS. 13–16 show preferred mechanisms for providing the feature of controlled funneling. The new manufacturing technology described in FIG. 1 of configuring the microchannels while the material is in the green state offers a major benefit which is the ability to choose and control the channel geometry. For instance, the microchannel cross section can be square, rectangular or other shape, including circular. The most desirable geometry, however, is the one that achieves highly tapered channels leading to the "funneling" effect. This is a mechanism for fine focusing of the secondary electrons as they exit the channels, reducing the spatial overlap of electrons from adjacent channels, and increasing the resolution by making the MTF approach unity. Furthermore, there exists the freedom to change the angle of tapering to optimize the secondary-electron emission dynamics. The channel tapering is produced by means of a high-precision stamping roller as shown in FIG. 13, which makes the tapered channel patterns in FIG. 14. FIG. 15 shows an example of how three green sheet layers are stacked and self-aligned after being stamped from both sides.

It is possible to produce channels with exit openings as small as 0.5 micron while the entrance opening can vary from 3 μm and higher. It is also possible to produce OARs at the entrance in excess of 80% while maintaining submicron exit openings. This result is not possible by means of prior-art MCP technologies. As a result of the high funnel ratio possible (the input channel area divided by the output channel area can exceed 25), a level of controllable funnel dimensions and parameters is reached which is impossible to achieve by previous MCP manufacturing processes.

Highly tapered channels with submicron exit openings produce focused secondary electron beams which are then accelerated to strike the phosphor screen without spatial overlap. This produces the most desirable Modulation Transfer Function (MTF) of near unity, and resolution that is identical to the channel pitch. Typically, a secondary-electron beam arrives at the phosphor screen with a width $W_b=3d_c$, Full Width at Half Maximum (FWHM). A value of $d_c=0.5$ μm gives $W_b=1.5$ μm. Thus, with a channel pitch of 1.5 μm, the beams of adjacent channels are completely separated from each other; therefore, their spatial overlap is nearly zero and hence an MTF of nearly unity is achieved—a factor of 10 improvement in resolution. To produce the same results (i.e., 1.5 μm pitch and 0.5 μm channel diameter) with the previous MCP technology is clearly a formidable task, if not impossible!

Because the new RMCP manufacturing technology has a significantly reduced number of steps and can be highly automated, the throughput is high and hence the cost is low. At modest volumes of 100,000 plates/year, high-resolution (MTF ~1) 75 mm×75 mm MCPs can be produced for less than $25.00, which is 20 to 40 times lower than the cost with previous MCP technology! This will lead to significant savings in next generation night vision systems.

FIG. 13 is a side view of a configuring roller blade 12 having many teeth 28. A great number of these blades are mounted together on a spindle (or etched into the surface of a precision roller) and rolled over the smoothed, partially dried ribbon of green-glass frit. See FIG. 1, where green-glass-ceramic ribbon 5 passes over backup roller 16 and is configured by configuring roller 12.

FIG. 14 is a plan view of the configured ribbon 5 showing how rows of microchannel forming configurators (funnel-formers) are pressed into the surface of the ribbon, leaving walls 29 defining openings 30.

FIG. 15 is a side elevation view of a stack of configured ribbons 5, showing how configured ribbons 31, 32 and 33 are carefully aligned to form funnel cavities 34. FIG. 15 is taken as if sectioned through the set of funnels 30 of FIG. 14. Green-glass frit configuration 35 is ready for the solidification step. After solidification, the interfaces between various layers 31–33 no longer exist as such, the layers being fused as one. The term "solidification" is used as a general term to indicate the fusing of the particles forming walls of the microchannels. This solidification may be by melting and fusing as in glass frit, by vitrification or by sintering as in ceramic particles, or by various combinations of these and other physical property change mechanisms.

Figure 16:
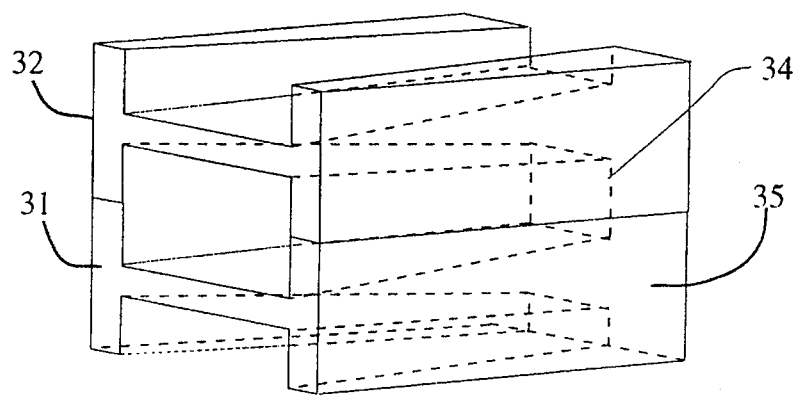
FIG. 16 is a three-dimensional showing of a stack of two glass-ceramic sheets illustrating how a complete microchannel is formed with individual sheets patterned by the roller of FIG. 13.

FIG. 16 is a transparency view of one funnel 34 and two complementary funnel forming configurations above and below funnel 34 in frit Configuration 35. After vitrification, there would no longer be a boundary between the two layers.

Extended Parameters

Microchannel configuration can be extended by parameters other than size and shape. Because the microchannel is formed of two layers which are open before being laminated, it is possible to add a layer of special lining material to the inside of the microchannel-forming depressions, usually by coating the entire surface of the configured green ribbon 5. The coating will be encapsulated during lamination, or may be placed only in the microchannel forming depressions, or may be coated universally and removed from the flat surface surrounding the depressions. An example of a lining material is cesium metal, an electron donor. Other lining materials may be chosen for other electrical properties, or for wear properties, or to solve other problems as they are defined.

While the invention has been shown and described with respect to a preferred embodiment and slight variations in the process for making it, there will be apparent to those skilled in the art various configurations and variations well within the spirit and scope of the invention, as pointed out in the following claims.

We claim:

1. A microchannel plate structure fabricated from a solidified powder, for use in image intensification, said microchannel plate structure comprising:

an input surface:

an output surface: and a plurality of microchannels having a solidified configuration generally determined by the green state configuration of said solidified powder prior to solidification during fabrication, wherein each said microchannel has an input channel opening at said input surface and an output channel opening at said output surface, and a constricted path directly extending from said channel input opening to said channel output opening.

2. The microchannel plate structure according to claim 1, wherein a first group of said plurality of said microchannels have a first channel configuration and a second group of said said plurality microchannels have a second channel configuration, and wherein said first channel configuration is different from said second channel configuration.

3. The microchannel plate structure according to claim 1, wherein said plurality of microchannels are arranged in an array.

4. The microchannel plate structure according to claim 2, wherein said first group of microchannels is substantially smaller than said second group of microchannels and are recognizable as alignment marks.

5. The microchannel plate structure according to claim 1, wherein said solidified power comprises one or more components for controlling one or more of electrical, thermal, mechanical, or optical characteristics of said microchannel plate.

6. The microchannel plate structure according to claim 5, wherein said one or more components is a dopant to control secondary emission of electrons.

7. The microchannel plate structure according to claim 5, wherein said one or more components is a surface layer including one or more components to control secondary emission of electrons.

8. The microchannel plate structure according to claim 5, wherein said one or more components is a form of cesium.

9. The microchannel plate structure according to claim 5, wherein said one or more components comprises a dopant.

10. The microchannel plate structure according to claim 5, wherein said one or more components is selected from the group consisting of glass, ceramic, metal, alloy and plastic.

11. The microchannel plate structure according to claim 1, wherein said one or more components is selected from the group consisting of glass, ceramic, metal, alloy and plastic, plus one or more dopants.

* * * * *